US 7,248,889 B2

(12) United States Patent
Schwarz et al.

(10) Patent No.: US 7,248,889 B2
(45) Date of Patent: Jul. 24, 2007

(54) METHOD AND DEVICE FOR CONTROLLING THE POWER IN AN ASYMMETRIC SOFT HANDOVER CONDITION

(75) Inventors: Uwe Schwarz, Veikkola (FI); David Soldani, Espoo (FI); Kari Sipilä, Vantaa (FI); Oscar Salonaho, Helsinki (FI); Harri Holma, Helsinki (FI)

(73) Assignee: Nokia Corporation, Espoo (FI)

( * ) Notice: Subject to any disclaimer, the term of this patent is extended or adjusted under 35 U.S.C. 154(b) by 279 days.

(21) Appl. No.: 10/476,652

(22) PCT Filed: Mar. 8, 2002

(86) PCT No.: PCT/IB02/00692

§ 371 (c)(1),
(2), (4) Date: Nov. 4, 2003

(87) PCT Pub. No.: WO03/077584

PCT Pub. Date: Sep. 18, 2003

(65) Prior Publication Data

US 2004/0142692 A1    Jul. 22, 2004

(51) Int. Cl.
*H04Q 7/20* (2006.01)
*H04B 7/00* (2006.01)

(52) U.S. Cl. .............. 455/522; 455/436; 455/439; 455/442

(58) Field of Classification Search .......... 455/522, 455/436, 439, 442, 443, 437, 452.2, 114.2, 455/278.1, 63.1, 296; 370/331, 332, 333, 370/334, 335

See application file for complete search history.

(56) References Cited

U.S. PATENT DOCUMENTS

| | | | | |
|---|---|---|---|---|
| 5,924,043 A * | 7/1999 | Takano | ........................ | 455/522 |
| 5,940,743 A * | 8/1999 | Sunay et al. | ................... | 455/69 |
| 6,028,851 A * | 2/2000 | Persson et al. | ............. | 370/329 |
| 6,070,086 A * | 5/2000 | Dobrica | ..................... | 455/522 |
| 6,084,904 A * | 7/2000 | Wang et al. | ................ | 375/130 |
| 6,101,179 A * | 8/2000 | Soliman | ..................... | 370/342 |
| 6,144,841 A * | 11/2000 | Feeney | ........................ | 455/69 |
| 2002/0181419 A1* | 12/2002 | Zhang et al. | ................ | 370/331 |
| 2003/0050084 A1* | 3/2003 | Damnjanovic et al. | ..... | 455/522 |
| 2003/0232622 A1* | 12/2003 | Seo et al. | .................... | 455/437 |
| 2005/0108615 A1* | 5/2005 | An et al. | ...................... | 714/776 |
| 2005/0176440 A1* | 8/2005 | Sang et al. | .................. | 455/453 |
| 2006/0246907 A1* | 11/2006 | Kaikkonen et al. | ........ | 455/442 |

FOREIGN PATENT DOCUMENTS

| | | |
|---|---|---|
| EP | 0 975 185 A1 | 1/2000 |
| EP | 1 032 237 A1 | 8/2000 |
| WO | WO 01/41485 A1 | 6/2001 |

* cited by examiner

*Primary Examiner*—Sonny Trinh
(74) *Attorney, Agent, or Firm*—Squire, Sanders & Dempsey L.L.P.

(57) ABSTRACT

A method and a device for controlling a method for controlling the power in an asymmetric soft handover condition in a communication network, including at least two cells each cell being served by a first type network device adapted to serve second type network devices in the respective cell. The method comprises:
temporarily adjusting (step S3) a communication parameter of at least one second type network device
to set up and/or maintain the communication of the second type network device with the first type network device of at least one of said cells.

58 Claims, 2 Drawing Sheets

METHOD AND DEVICE FOR CONTROLLING THE POWER IN AN ASYMMETRIC SOFT HANDOVER CONDITION

FIELD OF THE INVENTION

The present invention relates to a method and a device for controlling the transmission power in an asymmetric soft handover condition in a communication network including at least two cells.

BACKGROUND OF THE INVENTION

In mobile communication technologies like, e.g. UMTS (Universal Mobile Telecommunication System), base stations—so-called first type network devices—serve a limited number of mobile users—so-called second type network devices—according to the current location of the users. As long as a user is in a cell area of certain base station, he can obtain mobile services from that base station. The overall performance and the quality of the service depends—among others—on propagation conditions, cell type, cell size, load distribution and on the power level of the various signal transmissions, particularly of the pilot signal provided by each base station.

The pilot signal transmitted by each base station carries a bit sequence or code known by the mobile stations. The bit sequence can be base station and sector dependent. The power level of the pilot signal received by the mobiles is used by the mobile stations to measure the relative distance between different base stations that could be used for communication. Thus, the power level of the pilot signal of a base station determines how far a mobile can "hear" the base stations; i.e. the power of the pilot signal is an indication to the mobile station of its ability to successfully use the signal from that base station which is transmitting that pilot signal.

In Code Division Multiple Access networks (WCDMA-Systems for example) the cell selection, re-selection and the selection of the active set of cells which are used for communication is based on the relative strength of the received pilot signal power (CPICH Ec/Io, wherein Ec/Io=chip energy to total interference spectral density) from different cells. Thus, the borders of a cell are determined by the relative strength of the pilot signal received from different cells. Hence, the power level of the pilot signal determines the pilot power coverage, i.e. the area of the cell in which the pilot signal is sufficiently powered to be properly decoded by the mobile stations.

In the CDMA-Systems tight and fast power control is an important aspect, particularly on the uplink channel to avoid that one single overpowered mobile station blocks a whole cell. The solution is a fast closed-loop power control. By this control, the base station performs frequent estimates of the received Signal to Interference Ratio (SIR) and compares it to a target SIR. If the measured SIR is higher than the target SIR, the base station will command the mobile station to lower the power. If it is too low, it will command the mobile station to increase its power. The closed loop power control will thus prevent power inbalance among all the uplink signals received at the respective base station.

Additionally, a slower Outer Loop Power Control (OLPC-function) is provided which adjusts the target SIR in the base station according to the needs of the individual radio link and aims at a constant target quality, usually defined as a bit error rate (BER) or block error rate (BLER). As one would waste much power capacity if one would set the target SIR to the worst case, i.e. for high mobile speeds, the target SIR floats around a minimum value that just fulfils the required target quality. The target SIR will change as a function of time, speed and the propagation environment of the mobile changes. When the Outer Loop Power Control adjusts the target SIR in the respective base station, the fast closed loop control will react correspondingly and bring the SIR-value received in the associated base stations back to the target SIR value.

During a Soft Handover situation (SHO) a mobile station is in the overlapping cell coverage area of two cells belonging to different base stations. The communications between mobile station and the base stations take place concurrently via two air interface channels downlink from each base station separately. In uplink direction, the code channel of the mobile station is received from both base stations, but the received data is then routed to the associated radio network controller (RNC) for combining. Then, the RNC selects the better communication between the two possible radio links, and this selection takes place periodically, i.e. every 10 to 80 milliseconds.

In WCDMA-systems base stations are not synchronized, which is different to other current CDMA technologies and the synchronization of a new radio link between a mobile station and the base station takes place during the radio link set up procedure. The uplink synchronization will be achieved and maintained only if the base station can receive a strong enough signal from the mobile, i.e. if the transmission power of the mobile station is high enough. The transmission power of the mobile, is however, controlled by the power control of the "stronger" radio link. In this application the stronger link is defined as radio connection requiring less transmission power from the mobile, and the weaker link is defined as radio connection requiring more transmission power from the mobile. The "stronger" cell is defined to be the cell with the stronger link, and the "weaker" cell is defined to be the cell with the weaker link.

If the links in a soft handover area are strongly asymmetric, the transmission power of the mobile station may not be high enough to reach the other base station(s) where the link is weaker. This implies that for the cell included in the active set of cells and requiring significantly higher transmission power from the mobile, the uplink synchronisation will not be achieved or maintained, and the link set up to establish a soft handover procedure or the maintaining of the soft handover will practically fail.

This applies to any communication system where the transmission of a second type network devices (e.g. mobile) is received by more than one first type network device (e.g. base station) to setup and/or maintain a communication link but its transmission power cannot be adjusted individually to each first type network devices.

SUMMARY OF THE INVENTION

Therefore, the object underlying the invention resides in providing an enhanced method and device for controlling the power in an asymmetric soft handover situation in a communication network.

This object is solved by a method for controlling the power in an asymmetric soft handover condition in a communication network, including at least two cells each cell being served by a first type network device adapted to serve second type network devices in the respective cell, the method comprising:
   temporarily adjusting (step S3) a communication parameter of at least one second type network device
to set up and/or maintain the communication of the second type network device with the first type network device of at least one of said cells.

The above object is also solved by a device for controlling the power in an asymmetric soft handover condition in a communication network, including at least two cells
   each cell being served by a first type network device (BS1, BS2) adapted to serve second type network devices (MS) in the respective cell,
the device comprising:
   additional control means for temporarily adjusting a communication parameter of at least one second type network device
to set up and/or maintain the communication of the second type network device with the first type network device of at least one of said cells.

In accordance with the invention, the communication between first and second type network devices can be achieved and maintained even in an area where the cells are under strongly asymmetric conditions, and only a relevant communication parameter, for example the transmission power of the second type network device in question will have to be adjusted temporarily, exactly when needed.

Preferably, the communication parameter adjusted in the adjustment step includes the transmission power of the second type network device in question, so that the first type network devices, which serve the cells, remain unchanged.

Before adjusting the communication parameter in the adjusting step, preferably, information is detected which indicates the link quality of the second type network device in both cells (detecting step S1), and then an asymmetry parameter is evaluated, said asymmetry parameter indicating the imbalance of the link quality in the serving cells (evaluating step S2). On the basis of this asymmetry parameter, the transmission power of the second type network device in question is adjusted, if the asymmetry parameter exceeds a first threshold value.

In a preferred embodiment of the invention, this object is solved by a method for controlling the transmission power in an asymmetric soft handover condition in a mobile telecommunication network, including at least two cells partly overlapping each other
   each cell being served by a first type network device adapted to serve second type network devices in the respective cell,
   radio links in the stronger cell requiring less transmission power and in the weaker cell requiring more transmission power from the second type network device,
the method comprising the following steps:
   detecting information (step S1), said information indicating the radio link quality of the radio links between the second type network device and the first type network device of the overlapping cells
   evaluating a asymmetry parameter in the overlapping cell area (step S2) on the basis of the information gained in the detecting step (S1), said asymmetry parameter indicating the imbalance of the link quality in the overlapping cells
   temporarily increasing (step S3) the transmission power of said second type network device
      if the second type network device enters the overlapping cell area from the stronger cell and
      if the asymmetry parameter evaluated in step S2 exceeds a first threshold value,
to set up and/or maintain an uplink synchronization with the first type network device of the weaker cell.

In a preferred embodiment, the above object is also solved by a device for controlling the transmission power in an asymmetric soft handover condition of a mobile telecommunication network, including at least two cells (C1, C2) partly overlapping each other and participating in the soft handover
   each cell being served by a first type network device (BS1, BS2) adapted to serve second type network devices (MS) in the respective cell,
   a closed loop power control means controlling the transmission power of each second type network device in response to a comparison of the detected SIR-data (signal to interference ratio data) of its actual radio link, with a SIR-target value,
   an outer loop power control means (OLPC) providing and actualizing the SIR-target value for the closed loop power control means,
   radio links in the stronger cell (C1) of said cells requiring less transmission power and radio links in the weaker cell (C2) requiring more transmission power from the second type network device,
the device comprising the following steps:
   detection means for detecting information, said information indicating the radio link quality of the radio links between the second type network device (MS) and the first type network device (BS1, BS2) of the overlapping stronger cell (C1) and weaker cell (C2), respectively
   evaluation means for evaluating a asymmetry parameter in the overlapping cell area on the basis of the information gained from the detecting means, said asymmetry parameter indicating the imbalance of the link quality in the overlapping stronger cell (C1) and weaker cell (C2),
   additional control means for temporarily increasing the transmission power of said second type network device
      if the second type network device enters the overlapping cell area from the stronger cell and
      if the asymmetry parameter evaluated by the evaluation means, exceeds a first threshold value,
to set up and/or maintain an uplink synchronization with the first type network device of the weaker cell (C2).

Preferably, the link quality is represented—in accordance with the invention—by the link power budget of the respective links.

In a soft handover situation, i.e. when a mobile station (second type network device) is in the overlapping cell coverage area of two adjacent cells, the radio links of the mobile station to the base station (first type network device) of the "stronger" cell needs less transmission power from the second type network device than in a weaker cell.

If the mobile, i.e. the second type network device, is coming from the cell with the stronger link, i.e. from the cell transmitting the common pilot channel at a comparatively high level, the method according to the invention will establish the uplink synchronization with the first type network device of the weaker cell, thus implementing the weaker link. However, the second type network is not necessarily coming from the cell with the stronger link. If the second type network device enters from the cell with the weaker link into the overlapping area, the transmission power of the second type network device according to this invention is temporarily prevented from being lowered by the power control of the strongest link—and not increased—so as to meet the conditions required for soft handover. Otherwise, the uplink synchronization to the first network device of the stronger cell will succeed, but then the new stronger link will control the transmission power of the second type network device and the original cell's synchronization will fail.

To overcome these drawbacks, the invention detects information characterizing the radio link imbalance in the weaker cell and in the stronger cell. This information is used to evaluate an asymmetry parameter which is a measure of the radio link imbalance between the mobile and the respective base stations being different, i.e. asymmetric. The enhanced power control of the invention then increases the transmission power of the respective mobile station respectively prevents it from being lowered by the power control of the strongest link, in order to get resp. maintain a strong enough transmission signal for the weaker radio link to reach and maintain the uplink synchronisation of the signal emitted by that mobile station. Thus, in accordance with the invention the base station in the weaker cell will establish resp. maintain the synchronisation of the mobile station during soft handover, when the radio link is set up.

By the invention Soft Handover—an important feature of a WCDMA system—will be possible in strongly asymmetric overlapping cell areas. Only the mobile station in question increases respectively does not lower due to the power control of the strongest link the power, whereas a desensitisation of the respective base station of the strongest link would increase the transmission power of all mobile stations in the stronger cell. As the transmission power of the mobile station in question increases only temporarily, i.e. exactly when needed, the invention is economically handling the power budget. Temporary asymmetry in soft handover, e.g. due to different cell load (noise rise) will be handled automatically and no extra margin needs to be reserved therefor.

Finally, the concept of the invention allows more design freedom in the network in so-called future auto tuning systems which automatically adjust the relative strength of received pilot power in the cells. When the asymmetry in radio links in a SHO-area is not limiting the auto tuning capabilities, these auto tuning features are significantly more valuable.

In accordance with the preferred embodiment of the invention, the transmission power of the second type network device, i.e. the mobile station increases only, if the asymmetry parameter evaluated exceeds a first threshold value, and if additionally the mobile station enters the overlapping cell area, which is the soft handover area, SHO-area. Preferably, the transmission power of a respective mobile station resumes the original value or a different value, when the mobile station leaves the overlapping cell area. The new value of the transmission power may be newly determined by the power control of the serving cell.

The asymmetry parameter, indicating the different quality of radio links in the overlapping cells is dependent on different variables or factors, among which are the CPICH power level difference, the CPICH-$E_c/I_o$ difference, wherein $E_c/I_o$ is the chip energy to total interference spectral density; and the asymmetric uplink sensitivity established by mast head amplifiers if used. The different interference situation due to different cell loads is also relevant with regard to the asymmetry parameter also, the difference in required uplink $E_b/N_o$ may be taken into account for determining the asymmetry parameter with regard to the overlapping cells involved, $E_b/N_o$ being the signal to interference ratio in the radio access bearer of the radio links. One or more of these factors or variables may be detected in accordance with the invention to evaluate an asymmetry parameter of the invention.

In accordance with the preferred embodiment of the invention, each first type network device of each of the overlapping cells estimates the received Signal to Interference Ratio (SIR-value), i.e. for the stronger cell(s) and for the weaker cell(s), this SIR-value describing the radio link quality between the second type network device and the respective first type network devices effectively and individually. To evaluate the asymmetry parameter of the overlapping cells, an offset value $\Delta$SIR is calculated. This offset value $\Delta$SIR should be calculated based on measurements (noise rise, Eb/No) and parameters (CPICH transmit power, MHA). $\Delta$SIR itself could be the radio link asymmetry parameter. The calculation will be done preferably in the network radio controller.

To enhance the control of the transmission power of the second type network device the SIR-target value involved in the closed loop power control of said device is adjusted in response to the asymmetry parameter. If for example the $\Delta$SIR-value is defining the asymmetry parameter and is added as an SIR-offset value when the second type network device enters the SHO-area from the stronger cell, the closed loop power control will command the second type network device to increase its transmission power. Thus, in accordance with the invention, the SIR-target value originally provided by the outer loop power control (OLPC) is increased by a respective SIR-offset value which corresponds to the asymmetry parameter, so that the fast closed loop power control, which individually commands the transmission power of the second type network device, is working on an increased target and will thus command a correspondingly higher transmission power. The SIR-target value will resume the original value defined by the outer loop power control OLPC when the weaker cell, i.e. the unbalanced cell is removed from the active set of cells, or when the asymmetry condition is no longer existing. In case the second type network device enters the SHO area from the weaker cell, the transmission power of the second type network device is maintained at the current level instead of increased in order to maintain the weaker link.

Preferably, the SIR-offset value is a constant value. In accordance with an alternative embodiment of the invention, the SIR-target value provided by the OLPC-function is increased by adding an SIR-offset value, and the resulting new SIR-target value is kept constant as long as the asymmetry condition is present, or as long as the asymmetry parameter exceeds a pre-given threshold value. In accordance with a third alternative embodiment of the invention, the minimum allowed SIR-target value is adjusted, preferably increased, to guarantee the required transmission power of second type network device for setting up and/or maintaining all links envolved in the soft handover.

All embodiments, which increase resp. maintain the SIR-target value provided by the OLPC-function are based on the idea to temporarily adjust the target value of the closed loop power control, and as this closed loop power control is executed at a rate of for example 1.5 kHz, this increase operates faster than any significant change of pathloss could possibly happen. Once the asymmetry condition is over or the unbalanced, weak cell is removed from the active set of cells, the SIR-target value will resume its original value defined by the OLPC function and again being constantly updated by OLPC.

In the closed loop power control the respective first type network device, i.e. the respective base station, performs frequent estimates of the received signal to interference ratio (SIR) and compares it to the target SIR and this first type network device will command the second type network device, i.e. the mobile station, to adjust the power accordingly. This closed loop power control is very fast (i.e. 1500 times per second) and prevents any power inbalance among all the uplink signals received in the first type network device. In this context, the OLPC-function adjusts the target SIR set point in the first type network devices according to the needs of the individual radio link and aims at a constant quality, usually defined as a certain target bit error rate BER or block error rate BLER. The target SIR set point will change over time as the speed and the propagation environment of the second type network device changes.

When the asymmetry parameter evaluated in the evaluation step exceeds a pre-given first threshold value and thus requires temporarily increasing resp. maintaining the transmission power of the second type network device located in the overlapping cell area, this adjustment will be realized— in accordance with one further preferred embodiment of the invention—by increasing the quality target of the strongest links Outer Loop Power Control. The Outer Loop Power Control will increase resp. maintain the SIR-target value for the respective second type network device which is in soft handover condition. To resume the original SIR-offset value, the quality target is changed to its original value so that the OLPC-function commands the SIR-target value back to the original. This adjustment of the SIR-target value is determined by the react time of the OLPC-function, and is thus somewhat slower than changing the SIR-target value directly. However, this embodiment of the invention allows the SIR-target value to be fully controlled by the OLPC function in the radio network control of the network during these asymmetric soft handover situations and may result in a lower SIR-target in the first type network devices participating in the soft handover, thus reducing the uplink interference.

The invention can be implemented either by directly modifying the SIR-target value of the uplink OLPC function in the radio network controller or by reducing the error rate target (e.g. BLER or BER) of the transport channels within the particular radio resource control connection (RRC connection) during the soft handover situation. In any case, the situation is properly resumed when the unbalanced link, i.e. the unbalanced cell is moved from the active set, e.g. when the soft handover situation between unbalanced radio links belonging to different radio link sets is over.

In accordance with the invention, modifying the SIR-target value of the uplink OLPC function may be done in two preferred ways:
- increase the SIR-target value by an offset ΔSIR and keep the increased value constant as long as the handover condition is present resp. keep the SIR-target value constant in case the SHO area is entered from the weakest cell;
- increase the parameter minimum SIR-target of the uplink OLPC function to the current SIR-target+an offset value ΔSIR resp. maintain it, the current SIR-target being a time variable function in this embodiment, and the offset ΔSIR being preferably the asymmetry parameter of the invention as evaluated in step S2.

BRIEF DESCRIPTION OF THE DRAWINGS

The present invention will be more readily understood with reference to the accompanying drawings in which.

DETAILED DESCRIPTION OF PREFERRED EMBODIMENTS

In the following, preferred embodiments of the invention are described in more detail with reference to the accompanying drawings.

According to the invention, a procedure is provided to automatically increase the transmission power of a mobile station in a wideband code division multiple access system, if the mobile station is in a soft handover situation, said mobile being located in an area of overlapping cells.

Figure 1:
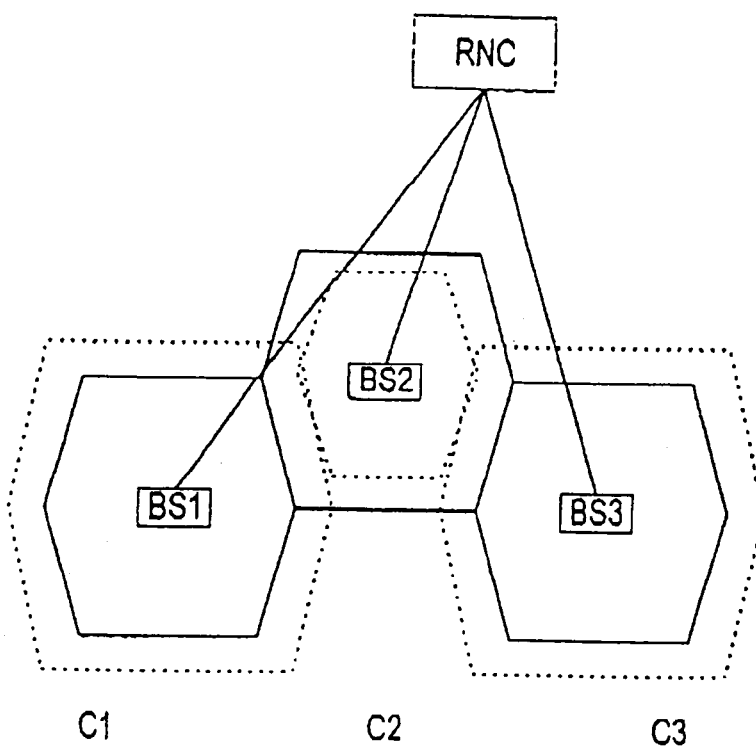
FIG. 1 shows the structure of a WCDMA-network.

FIG. 1 illustrates the basic structure of a WDMA-system, in which base stations BS1, BS2, BS3 each define an associated cell C1, C2, C3. Transmission links are provided from the base stations BS1, BS2, BS3 to the Radio Network Controller RNC; data received in the base stations are routed to the RNC for combining, for processing these data and for controlling the soft handover routines.

By each base station BS1, BS2, BS3 a pilot signal is emitted which carries a bit sequence or a code known by the mobile stations. The bit sequence is base station dependent. The received power level of the pilot signal is used by the mobile stations to measure the relative distance between different base stations that could be used for communication. Thus, the power level of the pilot signal of a base station BS1, BS2, BS3 determines the area of the associated cell C1, C2, C3. In the WCDMA-system the cell selection, re-selection and the selection of the active set of cells which are used for communication is based on the relative strength of the received pilot power CPICH-$E_c/I_o$, wherein $E_c/I_o$ is the chip energy to total interference spectral density from different cells. Thus, the boarders of a cell are determined by the relative strength of the received pilot signal from the associated base station. By changing the pilot power level, the area of the base station cells can be changed.

Mobile stations are in a soft handover situation SHO when the power of the pilot signals of two or more cells are within a predefined window. If so, the respective cells "overlap" and form the overlapping cell area or soft handover area.

Figure 2:
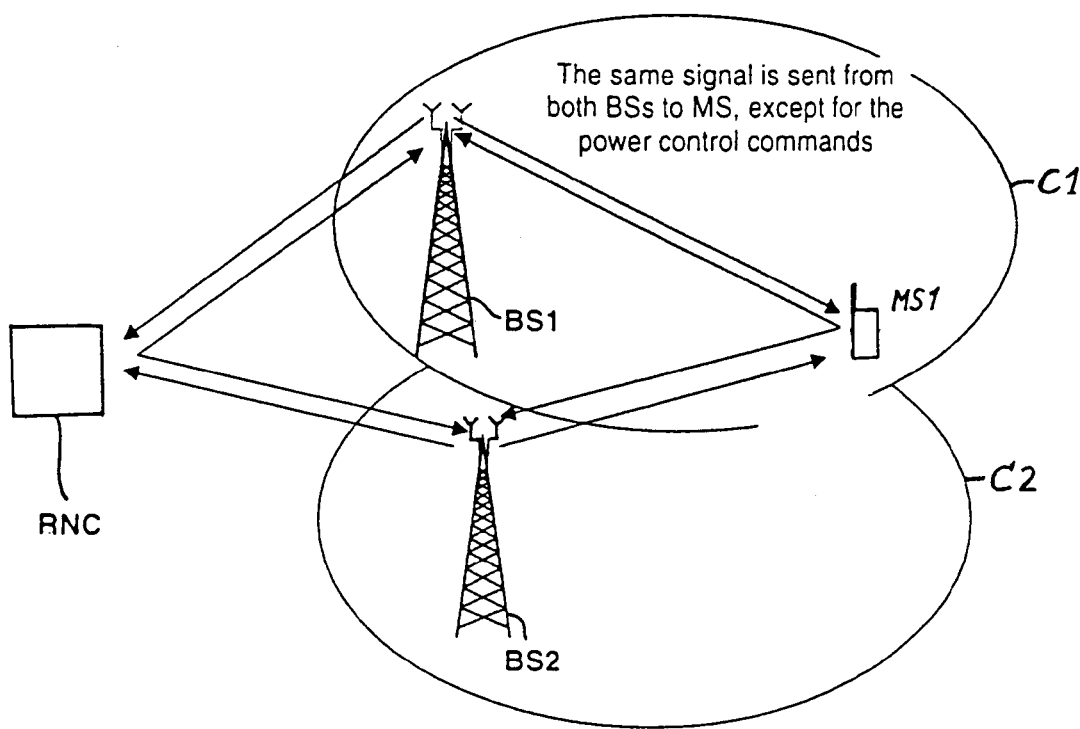
FIG. 2 shows a soft handover situation for a mobile station.

FIG. 2 illustrates soft handover for a mobile MS1 (second type network device), this mobile being in the overlapping cell coverage area of the two cells C1 and C2 belonging to different base stations BS1, BS2 (first type network device). In a soft handover situation, the communications between the mobile station MS1 and the base station take place concurrently via two air interface channels from each base station separately. In downlink, the same signal is sent from BS1 and BS2 to the mobile MS1 except for the power control demands. In uplink direction however, in soft handover the code channel of the mobile station MS1 is received from both base stations BS1 and BS2. The received data are then routed to the radio network controller RNC for further processing, and the better radio link between the two possible connections is selected within the RNC.

The uplink synchronization with the respective base station BS1, BS2 will be achieved and maintained if the base station can receive a strong enough transmission signal. The transmission power however, is controlled by the power control of the stronger air link, i.e. by that base station which receives the better signal.

If the radio links in soft handover between the mobile MS1 and the base stations BS1, BS2 are strongly asymmetric, the transmission power of the mobile MS1 may be high enough to reach one of the base stations, i.e. the base station of the stronger cell, it may be not high enough to reach the other base station—the base station of the weaker cell(s)—if the radio link is too weak. This implies, that for the significantly weaker cell included in the active set, the uplink synchronization will not be achieved or maintained and the radio link set up in soft handover will practically fail.

The invention concerns only soft handover situations in areas where the radio link power budget of the radio links to the overlapping cells are imbalanced, Different factors that contribute to the asymmetry are e.g.:

CPICH $E_c/I_o$ difference

CPICH power level difference (e.g. different transmit powers in micro and macro cells).

Mast head amplifier used (asymmetric uplink sensitivity).

Different interference situation due to different cell loads (asymmetric noise rise).

Difference in required uplink $E_b N_o$.

$E_b$=energy per user bit $N_o$=interference and noise power density.

In accordance with the invention, the procedure to automatically increase the transmission power of a mobile station MS1 in soft handover includes a first step in which information is detected which indicates the radio link power budget of the radio links to the base station BS1 of cell C1 and to base station BS2 of cell C2.

In a second step, this information is used to evaluate a radio link asymmetry parameter in the overlapping cell area. This parameter indicates the imbalance of the radio links in the overlapping stronger cell and weaker cell.

In a third step, the transmission power of the mobile station MS1 is temporarily increased if the asymmetry parameter exceeds a first threshold value, this power increase being such that the mobile reaches the base station of the weaker cell at a level which is sufficient to set up and maintain the uplink synchronization with the respective base station so that the soft handover will be performed.

The transmission power of each second type network device MS1 is controlled in response to the detected SIR-data of its actual radio link, these values being compared with a SIR-target provided and actualised by the OLPC-function in the Radio Network Controller.

Figure 3:
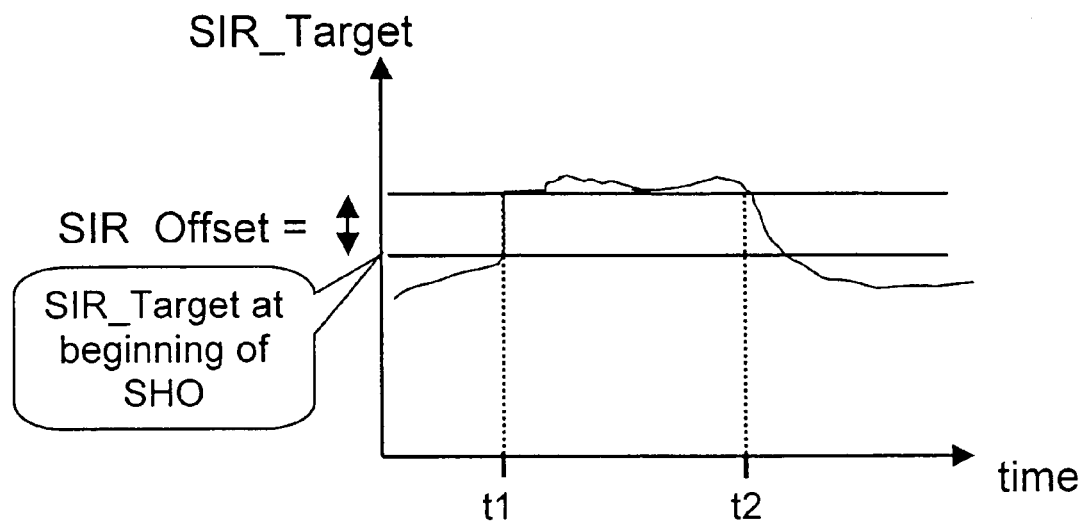
FIG. 3 shows a diagram representing the change of SIR-target value as a function of time in accordance with a preferred embodiment of the invention.

In accordance with one embodiment of the invention the asymmetry parameter indicating the imbalance difference of the radio links in the overlapping stronger cell and weaker cell is calculated a SIR-offset value $\Delta SIR$ which is added to the SIR-target value provided by the outer loop power control at time $t_1$, i.e. when the second type network device enters the soft handover area, cf. FIG. 3. As a consequence of increasing the SIR-target value which is forwarded to all first type network devices of the overlapping cells, the transmission power of the respective second type network devices increases simultaneously.

When the second type network device leaves the soft handover area at time $t_2$, the SIR-target value resumes the original value in the uplink OLPC-function of the radio network controller RNC, cf. FIG. 3. The SIR-target value is updated via the dedicated channel frame protocol.

As the SIR-target value is the reference value in the fast closed loop control for the transmission power of each second type network device, the increase of the SIR-target value is effected in all base stations involved in the soft handover. then, the closed loop power control automatically adjusts the transmission power of the respective second type network device correspondingly. By this procedure, the transmission power of the second type network device is increased to such a level that the uplink synchronisation with the first type network device, e.g. the base station of the weaker cell is set up and/or maintained as long as the asymmetric situation is present, i.e. as long as the second type network device is in the overlapping cell area.

During time $t_1$ and $t_2$, i.e. when the second type network device enters and leaves the soft handover area, the SIR-target value may—in one alternative embodiment of the invention—also be kept constant during the soft handover condition instead of showing the time dependency determined by the OLPC-function or assumed to be the minimum SIR-target value.

Figure 4:
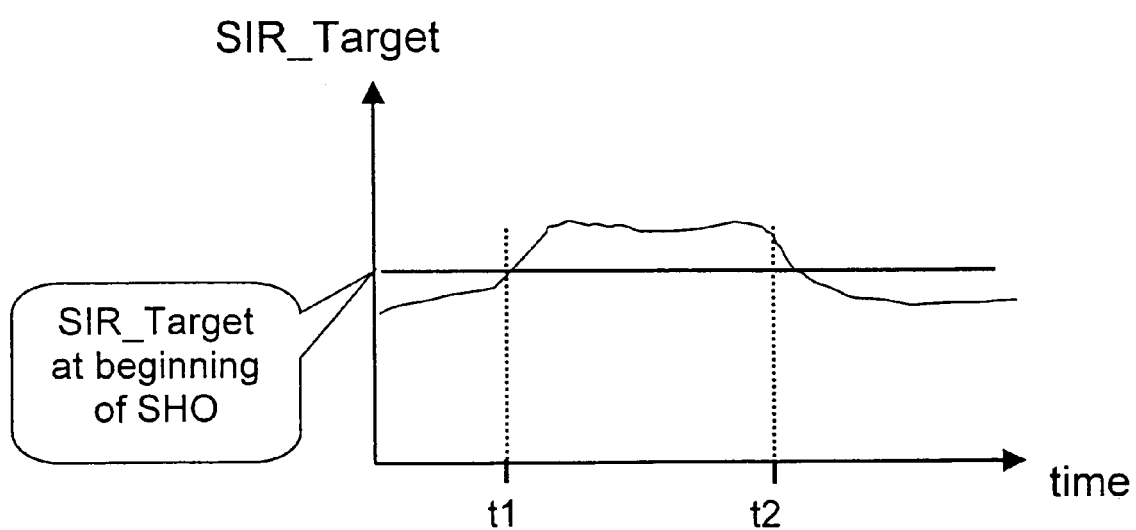
FIG. 4 shows a diagram illustrating the change of SIR-target value as a function of time in accordance with a second embodiment of the invention.

FIG. 4 shows the time dependency of the SIR-target value realized in a second embodiment of the invention. In this embodiment the invention is implemented by increasing the quality target of the transport channels within the particular Radio Resource Control connection (RRC-connection), i.e. the target bit error rate BER or the target block error rate BLER of the respective transport channels are reduced in accordance with the asymmetry parameter evaluated from the detected asymmetry information.

The quality target is changed at time $t_1$, if the second type network device MS1 enters the SHO-area, and the original value of the quality target is resumed at time $t_2$, i.e. when the soft handover between unbalanced radio links belonging to different cells is over. When increasing the quality target, the uplink OLPC-control function located in the RNC increases the SIR-target value correspondingly, this increase being however subject to the time constant of the OLPC-function, so that the SIR-target value increase is slower, cf. FIG. 4. This embodiment, if not too slow to cope with quick status changes, allows the SIR-target value to be fully controlled by the OLPC function in the radio network control during these asymmetric soft handover situations. The solution may result in a lower SIR-target value in the base stations participating in the soft handover, thus reducing the uplink interference.

The invention claimed is:

1. A method for controlling the power in an asymmetric soft handover condition, the method comprising:

evaluating an asymmetry parameter in the cell area;

temporarily adjusting a communication parameter of at least one second type network device on the basis of the asymmetry parameter to set up and/or maintain the communication of the second type network device with the first type network device of at least one of said cells; and controlling the power in an asymmetric soft handover condition in the communication network, wherein the communication network includes at least two cells, each cell being served by a first type network device configured to serve second type network devices in the respective cell.

2. Method according to claim 1, wherein the communication parameter adjusted during the adjusting of the communication parameter includes the transmission power of the second network device.

3. A method according to claim 1, the method comprising:
detecting information, said information indicating the link quality of the links between the second type network device and the first type network devices of the cells; and
temporarily adjusting the transmission power of at least one of said second type network devices in the adjusting step if the asymmetry parameter evaluated in the evaluating an asymmetry parameter exceeds a first threshold value;
wherein in the evaluating step the asymmetry parameter in the cell area is evaluated based on the information detected, said asymmetry parameter indicating an imbalance of the link quality in the cells.

4. A method according to claim 1,
wherein said at least two cells partly overlap each other,
each cell being served by a first type network device configured to serve second type network devices in the respective cell,
links in the stronger cell requiring less transmission power and in the weaker cell requiring more transmission power from the second type network device,
the method further comprising:
detecting information, said information indicating the link quality of the links between the second type network device and the first type network device of the overlapping cells
evaluating an asymmetry parameter in the overlapping cell area on the basis of the information gained in the detecting step, said asymmetry parameter indicating the imbalance of the link quality in the overlapping cells;
temporarily increasing the transmission power of said second type network device in the adjusting of the communication parameter;
if the second type network devices enter the overlapping cell area from the stronger cell; and
if the asymmetry parameter evaluated in the evaluation of the asymmetry parameter exceeds a first threshold value,
to set up and/or maintain an uplink synchronization of the second type network device with the first type network device of the weaker cell.

5. A method according to claim 4,
wherein the communication network is a mobile telecommunication network.

6. A method according to claim 4,
wherein the transmission power of the second type network devices are maintained in the adjusting of the communication parameter, if the second type network device enters the overlapping cell area from the weaker cell(s).

7. A method according to claim 4,
wherein the transmission power of the second type network device resumes another value when said second type network device leave the overlapping cell area.

8. A method according to claim 7, wherein the transmission power of the second type network device resumes the original value which was present before entering the overlapping area.

9. A method according to claim 7, wherein the transmission power of the second type network device resumes a value newly determined by power control of the serving cell.

10. A method according to claim 4, wherein the link quality information in the detecting step includes the link power budget information.

11. Method according to claim 4,
wherein the detecting of information is further adapted to include the detection of at least one of the following values:
CPICH-$E_c/I_o$ value of the overlapping cells,
CPICH power levels of the overlapping cells
the uplink sensitivity of the overlapping cells,
the different interference situation of the overlapping cells due to different cell loads,
the difference in required uplink $E_b/N_o$, whereby
$E_c$=average energy per PN chip for the pilot signal
$I_o$=total received power density including signal and interference
$E_b$=energy per user bit
$N_o$=.interference and noise power density.

12. Method according to claim 4,
wherein the detecting of information is further adapted to include the detection of the SIR-data (signal to interference ratio-data) for radio links of the second type network device with the first type network device of the stronger cell and the weaker cell.

13. Method according to claim 12,
wherein an SIR-offset value $\Delta$SIR is calculated in the evaluation step on the basis of the information gained in the detected information, the asymmetry parameter corresponding to this SIR-offset value.

14. Method according to claim 13,
wherein the transmission power of said second type network device increases by adding the SIR-offset value to the SIR-target value, the resulting new SIR-target value being forwarded to the first type network devices of the overlapping cells, the resulting new SIR-target value being kept constant as long as the asymmetry parameter exceeds a pre-given value.

15. Method according to claim 14,
wherein the SIR-target of the first type network devices resumes the original value when the weaker cell having reduced radio link conditions, is removed from the active set of cells.

16. Method according to claim 14,
wherein the SIR target of the first type network devices resumes the original value when the asymmetry parameter evaluated in the evaluation of the asymmetry parameter decreases below the first threshold value.

17. Method according to claim 14,
wherein the SIR-target of the first type network devices resumes the original value when the second type network device leaves the overlapping cell area.

18. Method according to claim 14,
wherein the SIR-target of the first type network devices resumes a value different from the original value, when the second type network device leaves the overlapping cell area.

19. Method according to claim 13,
wherein the SIR-offset value is a constant value.

20. Method according to claim 13,
wherein to temporarily increase the transmission power of the second network device, the Minimum SIR-target value of the uplink Outer Loop Power Control function is increased to minimum SIR-target=current SIR-target+$\Delta$SIR, and is forwarded to the first type network devices of the overlapping cells.

21. Method according to claim 4,
wherein the transmission power of each second type network device is controlled in response to an increased SIR-target value provided and actualised by an outer loop power control (OLPC) and forwarded to the first type network devices of the overlapping cells.

22. Method according to claim 4,
wherein the transmission power of the second type network device is maintained at the increased level as long as the strong radio link asymmetry evaluated in the evaluation of the asymmetry parameter exists in the overlapping cell area.

23. Method according to claim 4,
wherein increasing the transmission power in the adjusting of the communication parameter includes temporarily increasing the quality target of the Outer Loop Power Control means (OLPC function) on the basis of the asymmetry parameter gained in the evaluation of the asymmetry parameter, as a result of which the Outer Loop Power Control means temporarily increases the SIR-target value for the said second type network device which is in soft handover condition.

24. Method according to claim 23,
wherein temporarily increasing the quality target is realized by temporarily reducing the target Bit Error Rate (BER-target) or the target Block Error Rate (BLER-target) for the cells involved in handover.

25. Method according to claim 24,
resuming the quality target to the original value when the radio link asymmetry evaluation is over.

26. Method according to claim 24,
increasing the quality target of the outer loop power control when the second type network device enters the overlapping cell area.

27. Method according to claim 4,
wherein the mobile telecommunication network is a wideband code divisional multiple access network (WCDMA-System).

28. Method according to claim 1,
wherein the first type network device is a base station.

29. Method according to claim 1,
wherein the second type network device is a mobile station.

30. Device for controlling the power in an asymmetric soft handover condition in a communication network, including at least two cells
each cell being served by a first type network device (BS1, BS2) adapted to serve second type network devices (MS) in the respective cell, the device comprising:
evaluation unit configured to evaluate an asymmetry parameter in the cell area
additional control unit configured to temporarily adjust a communication parameter of at least one second type network device based on the asymmetry parameter to set up and/or maintain the communication of the second type network device with the first type network device of at least one of said cells,
wherein power is controlled in a communication network, including at least two cells, each cell being served by a first type network device (BS1, BS2) adapted to serve second type network devices (MS) in the respective cell.

31. Device according to claim 30, for controlling the power in an asymmetric soft handover condition of a communication network, including at least two cells (C1, C2) partly overlapping each other and participating in the soft handover
each cell being served by a first type network device (BS1, BS2) configured to serve second type network devices (MS) in the respective cell,
a closed loop power control unit configured to control the transmission power of each second type network device in response to a comparison of the detected SIR-data (signal to interference ratio data) of its actual radio link, with a SIR-target value,
an outer loop power control unit (OLPC) providing and actualizing the SIR-target value for the closed loop power control means,
radio links in the stronger cell (C1) of said cells requiring less transmission power and radio links in the weaker cell (C2) requiring more transmission power from the second type network device,
the device further comprising:
detection unit configured to detect information, said information indicating the radio link quality of the radio links between the second type network device (MS) and the first type network device (BS1, BS2) of the overlapping stronger cell (C1) and weaker cell (C2), respectively; and
additional control unit configured to temporarily increase the transmission power of said second type network device
if the second type network device enters the overlapping cell area from the stronger cell and
if the asymmetry parameter evaluated by the evaluation unit, exceeds a first threshold value,
to set up and/or maintain an uplink synchronization with the first type network device of the weaker cell (C2);
wherein the asymmetry parameter is evaluated in the overlapping cell area by the evaluation unit based on the basis of the information detected by the detecting unit, said asymmetry parameter indicating an imbalance of the link quality in the overlapping stronger cell (C1) and weaker cell (C2).

32. Device according to claim 31, wherein the link quality information gained by the detection unit includes link power budget information.

33. Device according to claim 31,
wherein the additional control unit is further configured to temporarily maintains the transmission power of said second type network device, if the second type network device enters the overlapping cell area from the weaker cell.

34. Device according to claim 31,
wherein the additional control units is further configured to increase the transmission power of the second type network device (MS) is incorporated in the closed loop power control means and/or the outer loop power control unit (OLPC).

35. Device according to claim 31,
wherein the additional control unit increases the transmission power of said second type network device (MS) only when the second type network device enters the overlapping cell area.

36. Device according to claim 31,
wherein the additional control unit resumes the original value of the transmission power of said second type network device when said device leaves the overlapping cell area.

37. Device according to claim 31, wherein the transmission power of the second type network device resumes a value newly determined by the power control unit of the serving cell, when said second type network device leaves the overlapping cell area.

38. Device according to claim 37,
wherein the additional control unit resumes the SIR-target value of the first type network devices to the original value when the second type network device leaves the overlapping cell area.

39. Device according to claim 31,
wherein the detection unit is further configured to include the detection of at least one of the following values:
CPICH-$E_c/I_o$ value of the overlapping cells,
CPICH power level difference of the overlapping cells,
the uplink sensitivity of the overlapping cells,
the different interference situation of the overlapping cells due to different cell loads,
the difference in required uplink $E_b/N_o$, whereby
$E_o$=average energy per PN chip for the pilot signal
$I_o$=total received power density including signal and interference
$E_b$=energy per user bit
$N_o$=. interference and noise power density.

40. Device according to claim 31,
wherein the detecting unit is configured to include the detection of the SIR-data (signal to interference ratio-data) for radio links of the second type network device (MS) with the first type network device (BS1, BS2) of the stronger cell (C1) and the weaker cell (C2).

41. Device according to claim 31,
wherein the evaluation unit calculates an SIR-offset value $\Delta$SIR on the basis of the information received by the detection unit, the asymmetry parameter corresponding to this SIR offset value.

42. Device according to claim 40,
wherein the SIR-offset value is a constant value.

43. Device according to claim 31,
wherein an additional control unit adds the SIR-offset value $\Delta$SIR to the SIR-target value provided by the outer loop power control (OLPC) and forwards this new SIR-target value to the fist type network devices of the overlapping cells.

44. Device according to claim 31,
wherein an additional control unit adds the SIR-offset value $\Delta$SIR to the actual SIR-target value when the second type network device enters the overlapping area and keeps the resulting new SIR-target value constant as long as the asymmetry parameter exceeds a pre-given value.

45. Device according to claim 31,
wherein to temporarily increase the transmission power of the second network device by the additional control unit, the minimum SIR-target value of the uplink OLPC function in the radio network controller will be increased to minimum SIR-target=current SIR-target+$\Delta$SIR, and is forwarded to the first type network device of the overlapping cells.

46. Device according to claim 31,
wherein the SIR-target value of the first type network devices (BS1, BS2) resumes the original value when the weaker cell (C2) having reduced radio link conditions, is removed from the active set of cells.

47. Device according to claim 31,
wherein the SIR-target value of the first type network devices (BS1, BS2) resumes a value different from the original value, when the weaker cell (C2) having reduced radio link conditions, is removed from the active set of cells.

48. Device according to claim 31,
wherein the additional control unit resumes the SIR target value of the first type network devices to the original value when the radio link asymmetry evaluated in the evaluation unit decreases below the first threshold value.

49. Device according to claim 48,
wherein the additional control unit resumes the quality target to the original value when the radio link asymmetry is over.

50. Device according to claim 31,
wherein the additional control unit resumes the SIR-target value of the first type network devices to the original value when the radio link asymmetry decreases below a second threshold value which is smaller than the first threshold value.

51. Device according to claim 31,
wherein the additional control unit is incorporated in the outer loop power control means (OLPC) and/or the closed control unit and increases temporarily the quality target of the outer loop power control unit (OLPC function) on the basis of the asymmetry parameter received from the evaluation unit, as a result of which the outer loop power control unit automatically increases the SIR-target value for the said second type network device which is in soft handover condition.

52. Device according to claim 51,
wherein temporarily increasing the quality target is realized by temporarily reducing the target Bit Error Rate (BER-target) or the target Block Error Rate (BLER-target) for the cells involved in handover.

53. Device according to claim 31,
wherein the additional control unit increases the quality target of the outer loop power control unit when the second type network device enters the overlapping cell area.

54. Device according to claim 31,
wherein the first type network device (BS1, BS2) is a base station.

55. Device according to claim 31,
wherein the second type network device (MS) is a mobile station.

56. Device according to claim 31,
wherein the closed loop power control unit is arranged in the first type network devices (BS1, BS2) and wherein the outer loop power control unit (OLPC) is arranged in the Radio Network Controller (RNC) of the first type network devices (BS1, BS2).

57. Device according to claim 31,
wherein the communication network is a mobile telecommunication network.

58. Device according to claim 31,
wherein the mobile telecommunication network is a Wideband Code Division Multiple Access Network (WCDMA System).

* * * * *